United States Patent Office 2,807,787
Patented Sept. 24, 1957

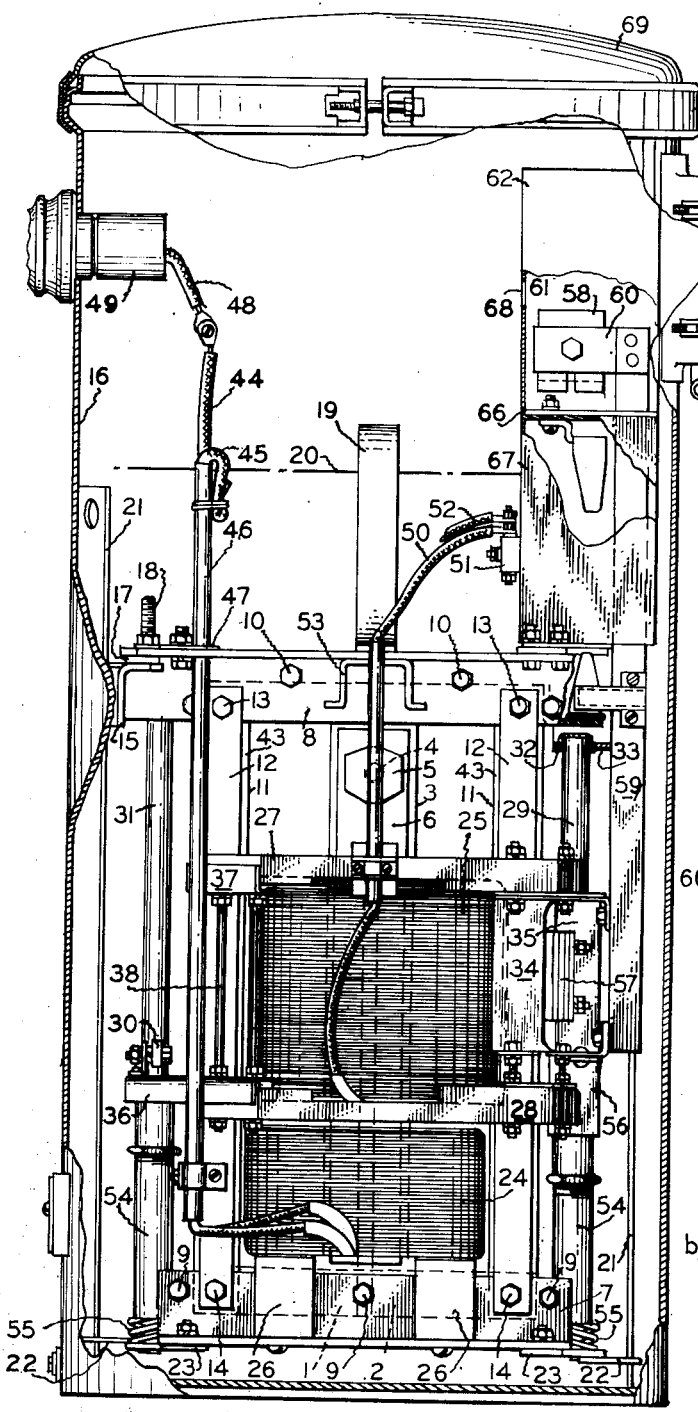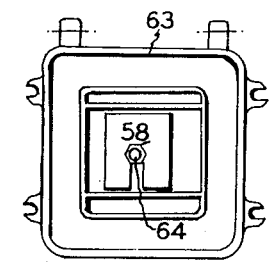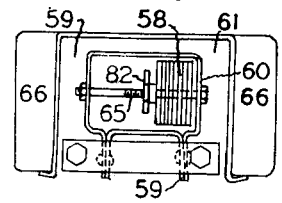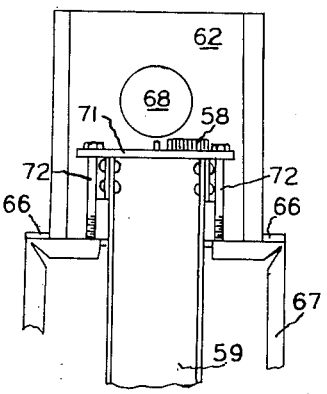
Sept. 24, 1957 — A. E. FOULDS ET AL — 2,807,787
CONSTANT CURRENT TRANSFORMER
Filed Sept. 3, 1954 — 2 Sheets-Sheet 1
Fig. 1
Fig. 4
Fig. 5
Fig. 6
Inventors:
Arthur E. Foulds
Justin Peterson
by, Richard E. Healey
Their Attorney

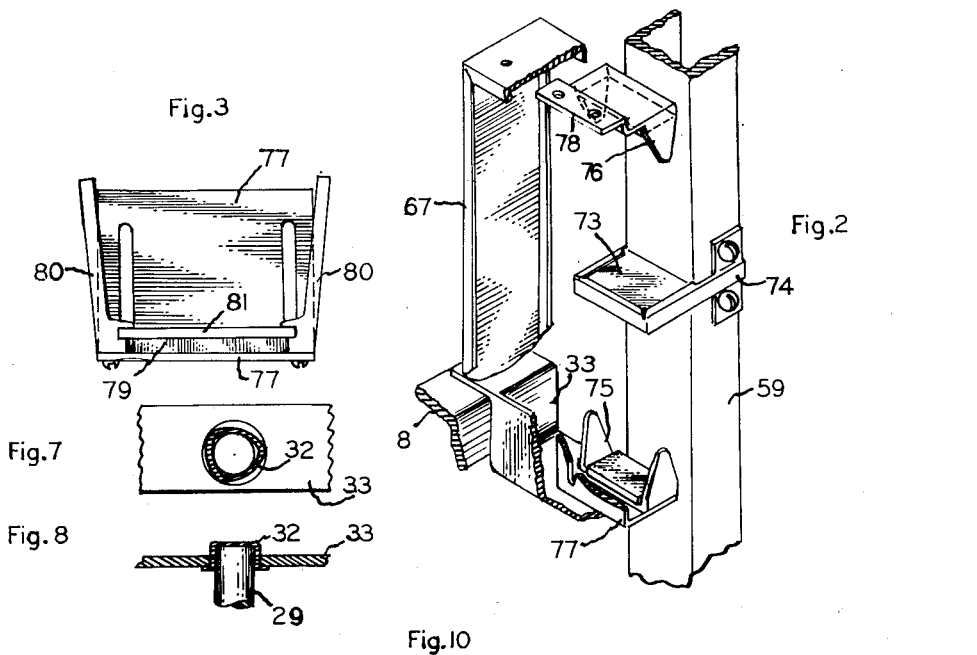
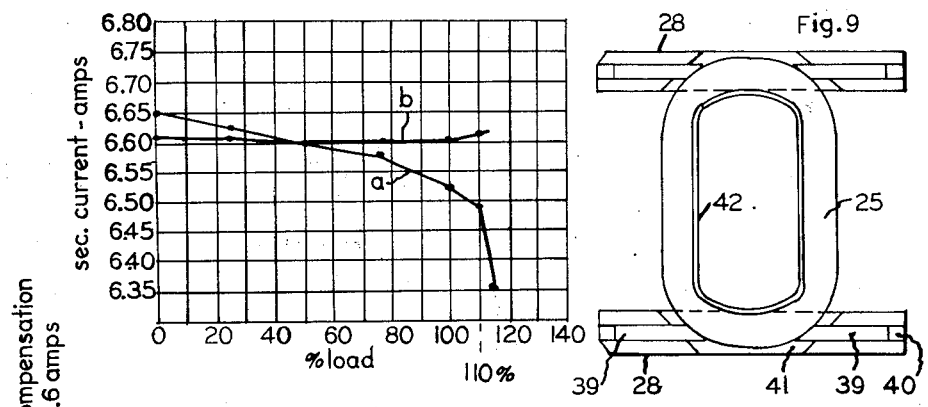
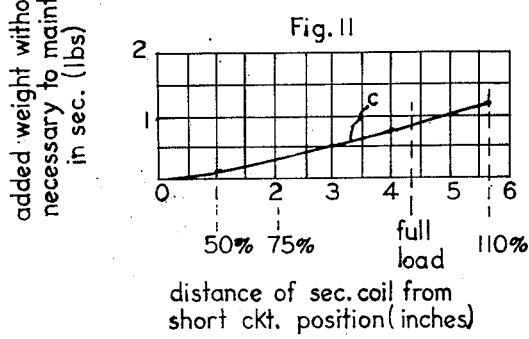
Inventors:
Arthur E. Foulds
Justin Peterson
by, Richard E. Hosley
Their Attorney

2,807,787

CONSTANT CURRENT TRANSFORMER

Arthur E. Foulds, Revere, and Justin Peterson, Swampscott, Mass., assignors to General Electric Company, a corporation of New York Application September 3, 1954, Serial No. 454,128

17 Claims. (Cl. 336—41)

Our invention relates to moving-coil constant current transformers.

A moving-coil constant current transformer is a valuable impedance device which regulates its output current to a substantially constant value throughout a large range of load impedance by the relative movement of its primary and secondary windings. Usually one winding is stationary and the other is supported for movement relative thereto. Fundamentally its equivalent circuit may be considered as a conventional low reactance distribution transformer with an external self adjusting variable series reactance. This reactance is the magnetic leakage reactance of the transformer windings and always adjusts itself to a value which when added to the load impedance permits substantially constant current to flow. The amount of reactance is determined by the position of the movable winding which in turn is maintained in this position by the force of repulsion between it and the fixed winding due to current flow through these windings. The desired output current sets up a definite force of repulsion which acts against a mechanical bias to float the movable winding to a position which produces this current. For any given set of conditions a state of electrical and mechanical equilibrium is attained whereby the force of repulsion exactly balances the net weight or mechanical bias of the movable winding. When the transformer is fully loaded and minimum series reactance is needed, the movable winding floats near the stationary winding and as load is removed and more reactance is required to regulate the current the movable winding floats away from the stationary winding. Changes of load tend to unbalance the equilibrium of forces by increasing or decreasing the force of repulsion. In a freely moving well-balanced mechanism any unbalance of forces is immediately counteracted by the movement of the floating coil to a new position which restores the mechanical-electrical balance.

In such transformers some means must be provided for guiding the movable winding relative to the fixed winding. Also, in order to cool the transformer, the internal mechanism of the transformer is usually immersed in oil or a similar dielectric liquid which is contained within a tank or enclosure for the transformer. Where a counterbalancing mechanism is employed for decreasing the net weight of the movable winding, this mechanism is frequently so bulky as to require an oil tank which is considerably larger than would be required for accommodating only the windings and core structure of the transformer. This of course increases the size and weight of the complete transformer. In order to reduce the size and weight of the transformer it has heretofore been proposed to increase the buoyancy and decrease the weight of the movable winding by using aluminum conductors therein instead of the usually employed copper conductors. With such an arrangement it is possible to have the force of repulsion and the buoyancy of the secondary winding greater than the weight of the movable winding assembly and thereby attain a magnetic suspension of the secondary winding and a complete elimination of the counterbalancing means heretofore employed. This enables the internal mechanism of the transformer to be enclosed in a tank of smaller size and the consequent employment of a smaller amount of cooling oil so that the total weight of the transformer is greatly reduced.

Preferably the construction of the transformer should be such that its movable assembly is quickly responsive to changes in the output current of the transformer and so that adjustments of this current output may be accomplished without removing the internal mechanism of the transformer from its enclosing tank or alternatively without draining the oil from this tank. This current adjustment is obtained by adjusting the weight of the movable assembly of the transformer and should be easy to make even when the transformer has been installed and is in operation. Furthermore the arrangement of parts of the transformer should provide for an easy assembly of preformed windings and for eliminating vibrations and noise resulting from the alternating flux present in the transformer. Also for efficient operation of the transformer losses due to the stray transformer flux should be reduced to a minimum. Means should also be provided for readily inspecting the oil level in the transformer and for holding the movable parts thereof against relative movement during shipment and installation.

It is an object of our invention to provide certain improvements in transformers employing a magnetic suspension of its movable winding.

It is also an object of our invention to provide a movable assembly for the movable winding of such a transformer in which the arrangement of magnetic and nonmagnetic parts are such as materially to reduce the losses due to stray fields of the windings thereof.

It is another object of our invention to provide in a movable assembly for such a transformer an adjustable clamping means which will accommodate variations in the sizes of its preformed windings and yet insure the proper location of such windings in the movable assembly and in the core structure of the transformer.

It is still another object of our invention to provide an improved supporting means for the movable assembly of the transformer whereby manufacturing variations in the sizes of its parts are accommodated and a firm and vibration proof support therefor obtained.

It is a further object of our invention to provide means for adjusting the weight of the movable assembly of the transformer and for securing the movable assembly during shipment without removing the internal mechanism of the transformer from its tank or draining the cooling fluid from this tank.

It is also an object of our invention to provide for the weight adjusting means and for the fastener used during shipment of the transformer, an auxiliary compartment in the top of the transformer above the oil level therein which compartment is mechanically shielded and electrically insulated from the remainder of the internal mechanism of the transformer and to which access may be gained through a hand hole normally closed by a cover.

Further objects of our invention will appear from the following description thereof.

In one embodiment of our invention the internal mechanism of the transformer is enclosed within an oil tank having a main opening at its top through which the internal mechanism of the transformer may be inserted and removed and an auxiliary opening or hand hole in its top portion above the normal oil filling in its tank. Covers are provided for both these main and auxiliary openings of the tank. Within the tank and opposite the hand hole therein we provide a compartment or chamber which is electrically and mechanically shielded from the current conducting parts of the internal mechanism of the transformer. This internal mechanism of the transformer comprises a magnetic core structure having a vertical central winding leg and a pair of vertical outer legs which cooperate to define a pair of windows within which the transformer windings are located about the central winding leg of the core. A movable assembly for one of the windings of the transformer is supported in a carriage for lengthwise movement along the central leg of its core structure in a vertical direction relative to the other winding thereof which is held in a fixed position in this core structure. This movable assembly is provided with a vertically extending arm the end of which is located in the chamber in the top portion of the transformer tank. On the upper end of this arm and within the chamber, means are provided for adjusting the weights of the movable assembly and for holding it in a fixed position during shipment of the transformer. The adjusting weights and shipping tie are readily accessible through the hand hole to this compartment and the weights may be adjusted and the shipping tie inserted and removed through this hand hole.

The movable assembly of the transformer is also provided in accordance with our invention with winding clamps which are adjustable to accommodate manufacturing variations in the size of the winding held thereby. This movable assembly has a bearing bracket and a guide bracket mounted for travel vertically along a bearing shaft and a guide shaft forming part of the core structure of the transformer. These shafts are supported in the core structure by cap shaped members which enclose the ends of the shafts and are located in holes or recesses in the frame of the core structure. These caps are so constructed as to accommodate variations in the size of the shafts and of the holes or recesses in which these caps are supported while at the same time securing a firm assembly of parts which will be free from vibration. These shafts and the metal portions of the movable assembly mounted thereon are located in back of the outer core legs of the transformer where they are shielded from stray magnetic flux and the coil clamps forming part of this movable assembly and which extend across the windows of the core structure are formed of non-magnetic material in order to reduce to a minimum the transformer losses due to stray flux.

A transformer embodying our invention may be provided with an improved magnetic compensator which respectively adds to and decreases the weights of the movable assembly as it moves toward and away from the fixed winding of the transformer in order to secure substantially constant current output from no load to full load on the transformer. The particular compensator employed by us is the invention of one of us, Arthur E. Foulds, and forms the subject matter of the claims in an application Serial No. 454,121 filed concurrently herewith, entitled Regulating Device for Electric Induction Apparatus, and assigned to the assignee of our present invention.

Our invention will be more fully understood and its various objects and advantages further appreciated by referring to the following detailed description taken in connection with the accompanying drawings in which Fig. 1 is an assembly view with parts broken away to show the internal structure of a constant current transformer embodying our invention, Fig. 2 is a detail view showing the manner in which the permanent magnets forming part of the magnetic compensator are positioned relative to one another, and Fig. 3 is a detail view of one of the permanent magnets showing the polar structure thereof. Figs. 4, 5, 6, 7, 8, and 9 are detail views of various structural features of this constant current transformer and Figs. 10 and 11 respectively present graphically the regulating characteristics of a constant current transformer with and without the magnetic compensator and the variation in weight required to be applied to the movable winding in order to obtain substantially flat regulation without compensation.

In Fig. 1 the internal mechanism of a constant current transformer embodying our invention has been exposed to view by breaking away portions thereof and of the oil tank enclosure within which it is mounted. The core structure thereof is formed by two separate rectangles 1 and 2 composed of stacked laminations made of grain oriented silicon steel. The vertical central winding leg of the core structure is formed by a vertical leg of each of these rectangles which are juxtaposed and spaced from one another by an amount to accommodate clamping bolts 4 which act through spring washers 5 and strips of insulating material 6 to hold these parts in adjusted position. The lower and upper portions of the core structure are held between pairs of steel angle clamps 7 and 8 which respectively engage the core structure and are held in clamping engagement therewith by bolts 9 and 10. The outer legs 11 of the core structure are held between channel shaped clamping bars 12 the lower and upper ends of which are respectively bolted to the pairs of angle clamps 7 and 8. These clamping bars 12 are given an initial convexity on their flanged sides so that when their ends are bolted to the angle clamps 7 and 8 a substantially uniform clamping force is applied lengthwise of the outer legs 11 of the core structure by their engagement therewith. The clamping bars 12 are separated and electrically insulated from the vertical outer legs of the core structure by thin strips of insulating material and the bolted connections 14 at the bottoms thereof are insulated from the lower pair of clamping angle 7 in order electrically to break the loop formed by the connection of these bars with the pairs of clamping angles 7 and 8. Also the clamping bolts 9 for the lower pair of clamping angles 7 are electrically insulated therefrom so as to break up the electric circuit through them from one clamping angle to the other. By employing this construction, losses due to stray transformer flux are materially reduced.

The core structure is supported within the enclosing oil tank therefor by bolting the outer corners of the upper pair of angle clamps 8 to four brackets 15 attached to the inner wall structure of the transformer tank 16. It is bolted to the tank through an anti-vibration mounting provided by resilient washers 17 which are positioned between the angle clamps 8 and the support brackets 15. These washers surround the nut and bolt connection 18 which is provided for holding the core structure in place on the brackets 15.

A lifting hook 19 is bolted to and forms a part of the core structure. Its lower ends are attached to the top pair of clamping angles 8 in line with the center of gravity of the core structure and its upper end extends above the oil level 20 in the transformer. The core structure is guided into place in its oil tank by means of a pair of rails 21 which extend lengthwise of its side walls, and slotted shoes 22 which engage these rails and are attached to plates 23 connecting the ends of the pair of clamping angle 7 to which they are bolted.

The primary and secondary windings 24 and 25 of the transformer surround the central leg 3 of the transformer core structure and are located within the pair of windows thereof defined by the two rectangular portions 1 and 2 of the core structure. The primary winding 24 is clamped to the bottom portion of the core structure by hardwood wedges driven between this winding and the vertical central leg 3 of the core structure. The lower end of the primary winding 24 rests on oil impregnated hardwood blocks 26 which rest on and are screw attached to the lower outwardly extending flanges of the lower pair of angle clamps 7. Felt or a similar material may be interposed between these blocks and the winding 24.

The secondary winding 25 is held between upper and lower pairs of oil impregnated hardwood clamps 27 and 28 forming part of a movable assembly having at one end bearings engaging a bearing shaft 29 and at the other end guide rolls 30 engaging a guide shaft 31. These main and auxiliary shafts 29 and 31 are spaced from and extend along the outer surfaces of the outer legs 11 of the core structure where the stray flux of the transformer windings is at a minimum. These shafts are supported in the framework of the core structure by means of caps 32 which enclose the ends of the shafts and are seated in holes or sockets formed in the core structure. Each of these caps, as best shown in Figs. 7 and 8, has a flanged body portion formed of resilient corrugations providing longitudinal inner and outer contact surfaces of limited area which respectively engage the outside of the end of the shaft which it encloses and the inside of the hole in which it is seated and held in place by its flange. In Figs. 7 and 8 the supporting portion of the core frame structure is the same as that shown at 33 in Fig. 1 where it constitutes a portion of a stirrup shaped member extending between the right hand end portions of the upper pair of angle clamps 8. This method of support prevents excessive horizontal movement of the shafts and consequently of the movable secondary winding 25. It also minimizes noise while providing adequate clearances for easy assembly of the parts with normal tolerances. Since the bearing shaft or main shaft 29 has a finished sized surface whereas the auxiliary guide shaft 31 is made of pipe and consequently has a variation in outside size, the supporting cap construction employed provides a mounting which will accommodate a limited range of shaft sizes and holes or sockets in the frame of the core structure. In the arrangement illustrated the caps for both the main and auxiliary shafts are identical. As shown in Fig. 7 the horizontal cross section of each cap is such that an inscribed circle has a diameter equal to the smallest allowable shaft size and a circumscribed circle has the diameter of the largest allowable hole size. The corrugated walls of the cap will consequently yield enough upon assembly of the parts to permit a firm support of the desired combination of shaft and suport therefor each of which may vary slightly in size. The resulting assembly will prevent vibration of the parts and the consequent noise resulting therefrom.

The movable assembly for the secondary winding 25 of the transformer includes a bearing bracket 34 provided with flanges to which the corresponding ends of the upper and lower pairs of coil clamps 27 and 28 are respectively attached through the agency of bolts. This bearing bracket includes a tubular body portion 35 housing two longitudinal ball bearings which engage and travel along the main shaft 29. Each of these bearings is provided with lengthwise extending ball races which position the ball bearings therein lengthwise of the bearing and of the shaft 29 which they engage. The ends of these ball races are connected by passageways through which the balls can move from one end of races to the other. These passageways are depressed so as to be out of engagement with the shaft 29. The two bearings are held in place in the cylindrical portion 35 of the bearing bracket by means of clamp rings against which they are held by a coil spring interposed between these bearings. The bearing bracket 34 supports the movable assembly for the transformer secondary winding 25 on main shaft 29 and when the internal mechanism of the transformer is immersed in oil the bearing pressure is quite light being only sufficient to compensate for any unbalance resulting from a difference in the centers of the force of repulsion and of the attraction of gravity on winding 25.

The lower left ends of the coil clamps 28 are connected by a metallic guide bracket 36 which extends across the outer surfaces of the outer legs 11 of the core and has its inner ends attached by bolts to the corresponding ends of the lower pair of winding clamps 28. The outer end of the guide bracket 36 provides a support for the two ball bearing guide rolls 30 which engage opposite sides of the guide shaft 31. The corresponding left ends of the upper coil clamps 27 are connected by a metal strap 37 which extends across the outer surface of the outer left leg 11 of the core structure. Bolts 38 extending between the left ends of the upper and lower pairs of coil clamps 27 and 28 hold the secondary winding 25 securely between these clamps at these ends. As previously stated the other ends of the pairs of clamps are attached to the metal bearing bracket 34 and in conjunction therewith clamp the other sides of the pairs of winding clamps in position relative to one another in order to hold the secondary winding 25 securely in place between these clamps.

It is to be noted that only non-magnetic members 27 and 28 extend across the windows of the core structure where the leakage flux of the transformer is greatest. These non-magnetic members however are connected at their ends by metallic members 34, 36, and 37 which in turn are connected with the ends of these non-magnetic members 27 and 28 by metallic bolts. All these magnetic members however are located to one side of the core windows and extend across the outer sides of the outer legs 11 of the core structure where the leakage flux is at a minimum. It will thus be noted that the movable assembly including its guide shafts 29 and 31 is so constructed as to reduce to a minimum the losses resulting from the stray field of the transformer.

The construction of the pairs of winding clamps 27 and 28 is illustrated in Fig. 9 which shows the lower pair as representative of both of these pairs. It will be noted that each of the pairs of clamps has an adjustable slide 39 located in a groove 40 extending lengthwise of each end thereof for positioning the winding 25 in a pocket 41 formed in the mid-portion of each clamp and that the slides 39 are positioned within their grooves 40 to make engagement with the outer periphery of winding 25. The movable carriage for the secondary winding 25 is assembled in a jig which properly positions winding 25 and the members 27, 28, 34, 36 and 37 relative to one another with slides 39 in grooves 40 engaging winding 25, for assembly in the core structure on the guide shafts 29 and 31 with winding 25 surrounding and spaced from the central winding leg 3 of the core. When all the parts are in proper adjustment relative to one another to accomplish these purposes, the clamping bolts are tightened in order to hold the slides 39 in adjusted position in grooves 40 and to bring the pairs of clamps 27 and 28 into clamping contact with winding 25 to make a rigid assembly which is then inserted in the core structure over the guide shafts 29 and 31 and over the central winding leg 3 of the core structure. It is to be noted that a preformed winding 25 is employed and that it is supported on a flattened cylinder 42 made of some insulating material such as Herkolite.

The metallic members of the movable assembly for winding 25, as well as the conductors of this winding, are preferably made of aluminum in order to decrease the weight of the assembly and increase its buoyancy so as to adapt it for magnetic suspension solely by the force of repulsion acting thereon and without the use of any counterbalancing mechanism. The conductors forming the primary winding 24 are preferably made of copper in order to reduce the size of this winding and thus provide more space for the secondary winding whose aluminum conductors require more space than its electric equivalent having copper conductors.

Each of the primary and secondary windings 24 and 25 are suitably insulated from the vertical central leg 3 of the core structure by the winding cylinders 42 on which they are mounted. The outer sides of these coils, where they pass through the windows of the core structure, are suitably insulated from the outer legs 11 of the core structure by strips of insulating material 43, such as Herkolite, which are held against the inner sides of these outer legs by means of cotton, asbestos or spun glass tape, the ends of which are held between the clamping bars 12 and the outer surfaces of the stacks of laminations forming the outer legs 11 of the core structure. The ends of the coil are held by the pairs of hardwood clamps 27 and 28 and are consequently properly insulated thereby. By employing clamps of the type above-described, variations in the size of the windings due to variations in their manufacture are readily accommodated thereby eliminating the necessity of cutting the clamps to fit the windings as would otherwise be necessary.

The outer terminals and the tap terminals of the primary winding 24 are connected through leads 44 and 45 which extend through fiber tubes 46 having their lower ends mounted in brackets attached to clamping bars 12 and their upper ends positioned relative to the upper pair of angle clamps 8 by members 47 which extend across the ends of these angle clamps. In the arrangement shown the outer terminal lead 44 is connected to the terminal lead 48 of an insulating bushing 49 which is mounted in the side wall of the transformer tank and extends through it to provide an external connection by means of which electric power may be supplied to the primary winding. The terminals of the secondary winding 25 are connected through leads 50 to terminals on an insulating block 51 and additional leads 52 connect the same terminals to the pushing leads of additional bushings mounted in the wall structure of the upper part of the transformer tank. The primary and secondary terminal bushings extend from opposite sides of the tank and only one bushing has been shown in Fig. 1 of the drawings in order to exemplify the arrangement employed.

Means are provided for determining the upper and lower limits of travel of the secondary winding 25 of the transformer. The movable assembly may move upwardly until winding clamps 27 engage bumpers 53 attached to the horizontally extending flanges of the upper pair of angle clamps 8. The travel of winding 25 toward winding 24 is determined by a pair of bumpers one member of each of which are pipes 54 having a coupling therebetween for determining their overall length. These pipes are supported on springs 55 which are seated on cross members 23 attached to the ends of the lower pair of angle clamps 7. The other part of the lower left hand bumper is formed by the body portion of the guide bracket 36 which engages the upper end of the left hand pipe assembly 54. The other part of the lower right hand bumper is formed by a metal bracket 56 which is attached to bearing bracket 34 and encloses the lower end of the bearing tube 35 of this bracket.

The current output of the transformer is determined by adjusting the weight of the movable assembly under operating conditions. In order to secure a coarse adjustment, means are provided for attaching plate shaped weights 57 to bracket 34 as a factory adjustment before it is shipped to the cutomer. Provision is also made for a fine weight adjustment which may be made by the customer or in the field by applying a predetermined number of weights 58 at the upper end of an arm or vertical standard 59 the lower end of which is attached to bracket 34 and extends lengthwise of the transformer tank adjacent its side wall structure and positions the bracket 60 for these weights at its upper end in a chamber or compartment 61 which is above the oil level 20 in the tank 16. This chamber 61 is mechanically and electrically isolated from the rest of the interior of the tank 16 by a wall structure 62 which is mounted on top of the core structure and completes with a portion of the wall structure of the tank an enclosure to which access may be gained through a hand hole which is formed in the top side wall of the tank 16 and which is closed by a door or cover 63. When the door 63 is open, access is gained to the chamber 61 and the number of weights added to the upper end of arm 59 may be changed in order to secure the fine current adjustments required to compensate for operating conditions encountered in the field such as sludging of the transformer oil. A stud 64 is provided on the inside of the cover 63 in order to store weights 58 which are not used in adjusting the weight of the movable assembly. As shown in Fig. 5 the desired number of fine weights 58 are clamped in position on a threaded stud 65 in bracket 60 by means of a hand wheel 82 making a threaded engagement with this stud. The weights 58 are slotted as shown so that they may be easily inserted on or removed from their position on the studs 64 and 65.

The wall structure 62 forming part of chamber 61 is supported by flanges 66 on the top of a frame member 67 having side members which are mounted on and bolted to the horizontal flanges of the pair of angle clamps 8 forming part of the core structure. The wall structure 62 is provided with an opening 68 opposite the hand hole opening in the top of tank 16 so that the operator or serviceman may fill the transformer tank 16 with oil without removing the main cover 69 which encloses the top opening of the tank. This cover 69 is held in place by a clamp band 70 which engages a flanged edge of cover 69 and a flanged portion of the upper part of the transformer tank 16. The opening 68 also provides a sighting means whereby the serviceman can determine, without removing the main cover 69, whether the oil level in the transformer is at the desired level.

When shipping the transformer, it is necessary to hold the movable assembly rigidly in place so as to prevent damage to the parts thereof. In the arrangement illustrated this is accomplished by means of a removable fastener located within chamber 61 and forming a connection between the upper end of the arm or standard 59 and the core mounted wall structure of the chamber provided by wall structure 62 and the upper portion of frame 67. This fastener is accessible through the hand hole in the upper side wall of the transformer tank when cover 63 therefor is open. The fastener is so dimensioned as to pass into and out of this chamber through this hand hole so that the transformer may be shipped in assembled relationship and made ready for service solely by opening the door 63 for the hand hole and removing the fastener. As shown in Figs. 5 and 6, this fastener comprises a strap or bar 71 which passes over the top end of the arm 59 and is secured to the bottom portion of chamber 61 by means of bolts 72. It is quite obvious that with bar 71 firmly bolted in place the movable assembly of the transformer is held in a fixed position against the lower set of stops therefor. This simple arrangement avoids previous complications in which elaborate arrangements were provided for holding the movable winding in place during shipment and because of which it was usually necessary to remove the internal mechanism of the transformer from its tank in order to condition it for operation.

Without compensation the output of a constant current transformer such as the above described will not stay exactly constant with changes in load. This is because the flux distribution is such that the secondary current is lower at full load when the windings are together than at no load when the windings are apart. Substantially constant current may be obtained, however, by making the weights of the movable system of the transformer greater at full load than at no load. This may be accomplished by employing the improved magnetic compensator shown in Figs. 1, 2, and 3 of the drawings which is the invention of one of us, Arthur E. Foulds.

The particular regulator shown comprises a permanent bar magnet 73 which is attached to and is movable with arm 59 forming part of the movable assembly for the secondary winding 25 of the transformer. Bar magnet 73 is firmly held in place between the clamping edges of a non-magnetic frame 74 the projecting open ends of which are attached to arm 59. Magnet 73 is positioned between and has a path of travel between two U-shaped permanent magnets 75 and 76. These U-shaped permanent magnets are supported on brackets 77 and 78 which are made of a non-magnetic material such as aluminum. These brackets in turn are respectively supported on the side wall structure of member 33 and on the inside top portion of frame 67 which together form an enclosure therefor. As shown in Fig. 3 which is an enlarged view of magnet 75 each of the U-shaped magnets 75 and 76 have a body portion 79 provided with pole pieces 80 which are attached to the supporting bracket for the magnet and are provided with flanged portions which abut the body portion 79 and engage the ends of a holding member 81 which has flanged edges for holding the body portion 79 in position between the pole pieces 80 when the ends of this holding member are engaged and held by the flanged portions of these pole pieces. Member 81 is preferably formed with a convexity on its flanged side so as to apply a substantially uniform clamping pressure lengthwise of the body portion 79 of the magnet. The pole pieces 80 are tapered toward their outer ends and laterally spaced and diverging from one another in order to provide a space within which the bar magnet 73 may pass at a terminal portion of its travel relative thereto. This polar structure provides for a substantially uniformly varying force of attraction between the magnets throughout their length of travel relative to one another. This modifies their attractive force which would otherwise be more in accordance with the square of the distance between them rather than in accordance with the linear function of this distance as is secured with the above arrangement.

The permanent magnets may be made of any suitable material but are preferably made of an alloy having a high retentivity and high coercive force and consequently a high energy per unit volume. Bar magnet 73 and the body portion 79 of the U-shaped magnets 75 and 76 are in the arrangement shown made of Alnico which is a magnetic alloy satisfying these requirements. The pole pieces 80 of magnets 75 and 76 are made of iron, steel or some other suitable magnetic material.

The pair of U-shaped permanent magnets 75 and 76 are each poled relative to the bar magnet 73 to exert a force of attraction thereon. Consequently when magnet 73 is midway between magnets 75 and 76 and winding 25 is midway in its path of travel, these magnets exert equal and opposite forces on the movable assembly for winding 25 and have no effect on it. When winding 25 moves below this neutral position, the force of attraction between the movable magnet and the lower magnet increases while that between the movable magnet and upper magnet decreases. On the other hand when winding 25 moves up from this neutral or mid-position, the attraction between the upper magnet and the movable magnet is increased and that between the lower magnet and the movable magnet is decreased. The result of this is that the effective weight of the movable assembly for winding 25 becomes larger when the coil moves down and smaller when it moves up. In this way the magnetic compensating arrangement tends to make the secondary current increase as the movable secondary winding approaches the stationary primary winding, and decrease as it approaches maximum separation at no load or short circuit. By proper adjustment this compensator can be made to cancel out the effect of the non-uniform flux distribution which occurs in a practical transformer. The resultant secondary current will consequently be almost exactly constant at all loads.

The weight of the movable assembly is initially adjusted for the desired secondary current output when the movable assembly for winding 25 is in a position where the attractive force of magnets 75 and 76 on 73 cancel one another, that is where they exert equal and opposite forces on the movable assembly. With this adjustment the effective weight of the movable assembly gets larger when it moves down and smaller when it moves up. In this way the compensator tends to make the secondary current increase as the windings move toward one another to a terminal position and to make the secondary current decrease as these windings move away from one another to their other terminal positions.

By referring to Fig. 10 the beneficial results obtained by using this magnetic compensator will become apparent. In this figure curve $a$ shows the regulation of a 20 kilowatt uncompensated transformer having the construction above illustrated and described whereas curve $b$ shows the substantially flat curve of regulation obtained by employing this magnetic regulator. Both of these curves illustrate the change in secondary current in amperes as the load varies in percent between zero and slightly more than full load.

The magnetic regulator satisfies the requirements set forth in curve $c$ of Fig. 11 which shows the added weight in pounds necessary to maintain a substantially constant current in the secondary of the transformer for varying distances in inches of the secondary coil from its short circuit position. It will be noted that this is a substantially straight line and that if the line of reference is changed from the zero value to a value of nearly a half pound, the left hand portion of the curve will represent the decrease in weight of the movable assembly brought about by the attraction of magnets 73 and 75 whereas the right hand portion thereof will indicate the increase in weight applied to this movable assembly as a result of the attraction between magnets 73 and 76. Thus with this arrangement, magnetic means activated by the travel of one of the windings of the transformer toward and away from the other winding thereof applies a force thereto which respectively increases and decreases the mechanical bias of said windings as they move toward and away from one another and which also increases in magnitude as one of the windings moves toward each end of its path of travel.

While we have shown but one embodiment of our invention it is quite obvious that variations may be made therein without departing from the spirit and scope thereof. Thus copper conductors may be substituted for the aluminum conductors of the movable winding and the desired additional buoyancy of the movable assembly attained by providing it with suitable floats. It is of course obvious that the movable winding need not be the secondary winding of the transformer but may be the primary winding thereof in which case the secondary winding would become the stationary winding. Furthermore, arrangements may be provided in which both of the windings are movable relative to one another and the desired mechanical bias obtained by some means other than gravity. It is also apparent that the magnetic compensating means disclosed need not be employed although it is preferable to employ a compensator of the type disclosed or its equivalent in order to obtain a flat regulating characteristic which will prevent damage to the load devices such as the lamps normally supplied by such a transformer. The particular physical structure of the component parts of our transformer may also be varied while still employing the teachings of our invention. We therefore wish to have it understood that we intend in the appended claims to cover all such modifications as fall within the true spirit and scope of our invention.

What we claim as new and desire to secure by Letters Patent of the United States is:

1. A constant current transformer comprising an enclosure for the herein specified internal mechanism of said transformer, said enclosure having a main opening for the insertion and removal of said mechanism and an auxiliary opening providing access to a portion of said mechanism, covers for said openings, a magnetic core structure within said enclosure and having a winding leg, primary and secondary windings surrounding said winding leg, one of said windings being stationary on said winding leg and the other of said windings being movable along said winding leg and mechanically biased towards said stationary winding from which it is moved against said bias in response to the magnetic repulsion existing between said windings due to current flow therein, a wall structure mounted on said core structure and forming with a portion of the wall structure of said enclosure at said auxiliary opening a chamber the interior of which is mechanically and electrically isolated from the remainder of said enclosure and its contents, an arm attached to and movable with said movable winding and having a portion thereof within said chamber, and means within said chamber and acting on said arm for adjusting said mechanical bias, said means being accessible for adjustment through said auxiliary opening in said enclosure.

2. A constant current transformer comprising an enclosure for the herein specified internal mechanism of said transformer, said enclosure having an opening and a cover therefor in a top portion of its side wall, a magnetic core structure within said enclosure and having a substantially rectilinear vertically disposed winding leg, primary and secondary windings surrounding said winding leg, one of said windings being stationary on the bottom portion of said winding leg and the other of said windings being movable along said winding leg and biased by gravity towards said stationary winding from which it is moved against said bias in response to the magnetic repulsion existing between said windings due to current flow therein, a wall structure mounted on the top of said core structure and forming with a portion of the wall structure of said enclosure at said opening a chamber the interior of which is mechanically and electrically isolated from the remainder of said enclosure and its contents, a vertical standard attached to and movable with said movable winding and having a portion thereof within said chamber, a plurality of adjusting weights each of which is dimensioned to pass through said opening in said enclosure, and means operable through said opening in said enclosure for holding a selected number of said weights on said portion of said standard which is within said chamber.

3. A constant current transformer comprising an enclosure for the herein specified internal mechanism of said transformer, said enclosure having an opening and a cover therefor in a top portion of its side wall, a magnetic core structure within said enclosure and having a substantially rectilinear vertically disposed winding leg, primary and secondary windings surrounding said winding leg, one of said windings being stationary on the bottom portion of said winding leg and the other of said windings being movable along said winding leg and biased by gravity towards said stationary winding from which it is moved against said bias in response to the magnetic repulsion existing between said windings due to current flow therein, a wall structure mounted on the top of said core structure and forming with a portion of the wall structure of said enclosure at said opening a chamber the interior of which is mechanically and electrically isolated from the remainder of said enclosure and its contents, a vertical standard attached to and movable with said movable winding and having a portion thereof within said chamber, a magnetic member mounted on said standard between cooperating magnetic members respectively located on said core structure, a plurality of adjusting weights each of which is dimensioned to pass through said opening in said enclosure, and means operable through said opening in said enclosure for holding a selected number of said weights on said portion of said standard which is within said chamber.

4. A constant current transformer comprising an enclosure for the herein specified internal mechanism of said transformer, said enclosure having a main opening for the insertion and removal of said mechanism and an auxiliary opening providing access to a portion of said mechanism, covers for said openings, a magnetic core structure within said enclosure and having a winding leg, primary and secondary windings surrounding said winding leg, one of said windings being stationary on said winding leg and the other of said windings being movable along said winding leg and mechanically biased towards said stationary winding from which it is moved against said bias in response to the magnetic repulsion existing between said windings due to current flow therein, a wall structure mounted on said core structure and forming with a portion of the wall structure of said enclosure at said auxiliary opening a chamber the interior of which is mechanically and electrically isolated from the remainder of said enclosure and its contents, an arm attached to and movable with said movable winding and having a portion thereof within said chamber, and a detachable fastener within said chamber and between said arm and said core mounted wall structure of said chamber, said fastener being accessible through said auxiliary opening and being dimensioned to pass into and out of said chamber through said auxiliary opening.

5. A constant current transformer comprising an enclosure for the herein specified internal mechanism of said transformer, said enclosure having an opening and a cover therefor in the top portion of its side wall, a magnetic core structure within said enclosure and having a substantially rectilinear vertically disposed winding leg, primary and secondary windings surrounding said winding leg, one of said windings being stationary on the bottom portion of said winding leg and the other of said windings being movable along said winding leg and biased by gravity towards said stationary winding from which it is moved against said bias in response to the magnetic repulsion existing between said windings due to current flow therein, a vertical standard attached to and movable with said movable winding and having an upwardly projecting end portion, a plurality of adjusting weights, dimensioned to pass through said opening in said enclosure, means operable through said opening in said enclosure for holding a selected number of said weights on said projecting end portion of said standard, a wall structure mounted on the top of said core structure and forming with a portion of the wall structure of said tank at said opening in said enclosure a chamber accommodating the lengthwise travel of the projecting end portion of said standard, and a detachable fastener operable through said opening in said enclosure, located within said chamber and forming a connection between said projecting end portion of said standard and said core mounted wall structure of said chamber.

6. An oil cooled constant current transformer comprising an oil tank for enclosing the herein specified internal mechanism of said transformer, said tank having an opening and a cover therefor in the top portion of its side wall at a position which is above the normal oil filling in said tank, a magnetic core structure within said enclosure and having a substantially rectilinear vertically disposed winding leg, primary and secondary windings surrounding said winding leg, one of said windings being stationary on the bottom portion of said winding leg and the other of said windings being movable along said winding leg and biased by gravity towards said stationary winding from which it is moved against said bias in response to the magnetic repulsion existing between said windings due to current flow therein, a wall structure mounted on the top of said core structure and forming with a portion of the wall structure of said tank at said opening a chamber which is above the oil level in said tank and which is mechanically and electrically isolated from the remainder of said tank and its contents, a vertical standard attached to and movable with said movable windings and having a portion thereof within said chamber, a plurality of adjusting weights dimensioned to pass through said opening in said tank, and means operable through said opening in said tank for holding a selected number of said weights on said portion of said standard which is within said chamber.

7. An oil cooled constant current transformer comprising an oil tank for enclosing the herein specified internal mechanism of said transformer, said tank having an opening and a cover therefor in the top portion of its side wall at a position which is above the normal oil filling in said tank, a magnetic core structure within said enclosure and having a substantially rectilinear vertically disposed winding leg, primary and secondary windings surrounding said winding leg, one of said windings being stationary on the bottom portion of said winding leg and the other of said windings being movable along said winding leg and biased by gravity towards said stationary winding from which it is moved against said bias in response to the magnetic repulsion existing between said windings due to current flow therein, a wall structure mounted on the top of said core structure and forming with a portion of the wall structure of said tank at said opening a chamber which is above the oil level in said tank and which is mechanically and electrically isolated from the remainder of said tank and its contents, said chamber having an oil filling and oil level sight opening in said core mounted wall structure portion thereof, a vertical standard attached to and movable with said movable winding and having a portion thereof within said chamber, a plurality of adjusting weights dimensioned to pass through said opening in said tank, and means operable through said opening in said tank for holding a selected number of said weights on said portion of said standard which is within said chamber.

8. A constant current transformer comprising an oil tank for enclosing the herein specified internal mechanism of said transformer, said tank having a hand hole and a cover therefor in the top portion of its side wall at a position which is above the normal oil level in said tank, a magnetic core structure within said tank and having a vertical central winding leg and a pair of vertical outer legs which cooperate to define a pair of windows in said core structure, primary and secondary windings within said windows of said core structure and surrounding said central leg thereof, means for clamping one of said windings in the bottom portion of said core structure, non-magnetic clamps arranged in pairs opposite said windows in said core structure for holding the other of said windings, main and auxiliary shafts respectively spaced from and extending along the outer surfaces of said outer legs of said core structure, a bearing bracket mounted for movement lengthwise of said main shaft, a guide bracket having guide means in engagement with said auxiliary shaft, means including said bearing bracket and said guide bracket respectively located at opposite ends of said pairs of clamps for forming therewith for said other of said windings a carriage movable lengthwise of and guided by said shafts, a wall structure mounted on the top of said core structure and completing with a portion of the wall structure of said tank at said hand hole a chamber which is above the oil level in said enclosure and the interior of which is mechanically shielded and electrically insulated from the remainder of said tank and its contents, a vertical standard attached at its lower end to said bearing bracket and having its upper end projecting into said chamber, a plurality of adjusting weights dimensioned to pass through said hand hole in said tank, and means operable through said hand hole for holding a selected number of said weights on the end of said standard which projects into said chamber.

9. A constant current transformer comprising an oil tank for enclosing the herein specified internal mechanism of said transformer, said tank having a hand hole and a cover therefor in the top portion of its side wall at a position which is above the normal oil filling in said tank, a magnetic core structure within said tank and having a vertical central winding leg and a pair of vertical outer legs which cooperate to define a pair of windows in said core structure, primary and secondary windings within said windows of said core structure and surrounding said central leg thereof, means for clamping one of said windings in the bottom portion of said core structure, non-magnetic clamps arranged in pairs opposite said windows in said core structure for holding the other of said windings, main and auxiliary shafts respectively spaced from and extending along the outer surfaces of said outer legs of said core structure, a bearing bracket mounted for movement lengthwise of said main shaft, a guide bracket having guide means in engagement with said auxiliary shaft, means including said bearing bracket and said guide bracket respectively located at opposite ends of said pairs of clamps for forming therewith for said other of said windings a carriage movable lengthwise of and guided by said shafts, a wall structure mounted on the top of said core structure and completing with a portion of the wall structure of said tank at said hand hole a chamber which is above the oil level in said tank and the interior of which is mechanically and electrically isolated from the remainder of said enclosure and its contents, a vertical standard attached at its lower end to said bearing bracket and having its upper end projecting into said chamber, a magnetic member mounted on said standard between cooperating spaced magnetic members respectively located on said core structure, a plurality of adjusting weights dimensioned to pass through said hand hole in said tank, means operable through said hand hole for holding a selected number of said weights on the end of said standard which projects into said chamber, and means for holding the remainder of said weights on said door for said hand hole.

10. A constant current transformer comprising an oil tank for enclosing the herein specified internal mechanism of said transformer, said tank having a hand hole and a cover therefor in the top portion of its side wall at a position which is above the normal oil filling in said tank, a magnetic core structure within said tank and having a vertical central winding leg and a pair of vertical outer legs which cooperate to define a pair of windows in said core structure, primary and secondary windings within said windows of said core structure and surrounding said central leg thereof, means for clamping one of said windings in the bottom portion of said core structure, main and auxiliary cylindrical shafts respectively spaced from and extending along the outer surfaces of said outer legs of said core structure, means, including caps seated in holes in said core structure and enclosing the ends of said shafts, for supporting said main and auxiliary shafts, each of said caps having a flanged body portion formed of resilient corrugations providing longitudinal inner and outer contact surfaces of limited area which respectively engage the outside of the end of the shaft which it encloses and the inside of the hole in which it is seated and held in place by said flange, a bearing bracket mounted for movement lengthwise of said main shaft, a guide bracket having guide means in engagement with said auxiliary shaft, non-magnetic members each of which has an adjustable slide located in a groove extending lengthwise of each end thereof for positioning said other winding in a pocket formed in the mid portion thereof, means for clamping said slides in adjusted positions in said grooves with the ends thereof against said other winding seated in a desired position in said pocket, means including said bearing bracket and said guide bracket respectively located at opposite ends of said members for forming therewith for said other winding a carriage movable along and guided by said shafts, means for clamping said other winding in said carriage between said members, a wall structure mounted on the top of said core structure and completing with a portion of the wall structure of said tank at said hand hole a chamber which is above the oil level in said tank and which is mechanically and electrically isolated from the remainder of said tank and its contents, said chamber having an oil filling and oil level sight opening in said wall structure part thereof which is mounted on said core structure, a vertical standard attached to said bearing bracket and having its upper end within said chamber, a magnetic member mounted on said standard between cooperating spaced magnetic members respectively located on said core structure, a plurality of adjusting weights dimensioned to pass through said hand hole in said tank, means operable through said hand hole in said tank for holding a selected number of said weights on said upper end of said standard, means for holding the remainder of said weights on said door for said hand hole, and a removable fastener located within said chamber and forming a connection between said upper end of said standard and said core mounted wall structure of said chamber, said fastener being accessible through said hand hole and being dimensioned to pass into and out of said chamber through said hand hole.

11. A constant current transformer comprising a magnetic core structure having a vertical central winding leg and a pair of vertical outer legs which cooperate to define a pair of windows in said core structure, primary and secondary windings within said windows of said core structure and surrounding said central leg thereof, means for clamping one of said windings in said core structure, non-magnetic clamps arranged in pairs opposite said windows in said core structure for holding the other of said windings, main and auxiliary shafts respectively spaced from and extending along the outer surfaces of said outer legs of said core structure, a bearing bracket mounted for movement lengthwise of said main shaft, a guide bracket having guide means in engagement with said auxiliary shaft, means including said bearing bracket and said guide bracket respectively located at opposite ends of said pairs of clamps for holding therebetween portions of said other winding which extend beyond said windows in said core structure, a vertical standard attached to said bearing bracket, a magnetic member mounted on said standard between cooperating spaced magnetic members respectively located on said core structure, a plurality of adjusting weights, and means for holding a selected number of said weights on the projecting upper end of said standard.

12. A constant current transformer comprising an oil retaining enclosure for the internal mechanism of said transformer, a magnetic core structure within said enclosure and having a vertical central winding leg and a pair of vertical outer legs which cooperate to define a pair of windows in said core structure, primary and secondary windings within said windows of said core structure and surrounding said central leg thereof, means for clamping one of said windings in said core structure, non-magnetic clamps arranged in pairs opposite said windows in said core structure for holding the other of said windings, main and auxiliary shafts respectively spaced from and extending along the outer surfaces of said outer legs of said core structure, a bearing bracket mounted for movement lengthwise of said main shaft, a guide bracket having guide means in engagement with said auxiliary shaft, means including said bearing bracket and said guide bracket respectively located at opposite ends of said pairs of clamps for holding therebetween portions of said other winding which extend beyond said windows in said core structure, a vertical standard attached to said bearing bracket and having an upper end projecting above the normal oil level in said enclosure, a magnetic member mounted on said standard between cooperating spaced magnetic members respectively located on said core structure, a plurality of adjusting weights, and means for holding a selected number of said weights on the projecting upper end of said standard.

13. A constant current transformer comprising an oil retaining enclosure for the herein specified internal mechanism of said transformer, a magnetic core structure within said enclosure and having a vertical central winding leg and a pair of vertical outer legs which cooperate to define a pair of windows in said core structure, primary and secondary windings within the windows of said core structure and surrounding said central leg thereof, means for clamping one of said windings in said core structure, non-magnetic clamps arranged in pairs opposite said windows in said core structure for holding the other of said windings, main and auxiliary shafts respectively spaced from and extending along the outer surfaces of said outer legs of said core structure, a bearing bracket mounted for movement lengthwise of said main shaft, a guide bracket having guide means in engagement with said auxiliary shaft, means including said bearing bracket and said guide bracket respectively located at opposite ends of said pairs of clamps for holding therebetween portions of said other winding which extend beyond said windows in said core structure, a vertical standard attached to said bearing bracket and having an upper end projecting above the normal oil level in said enclosure, a plurality of adjusting weights, and means for holding a selected number of said weights on the projecting upper end of said standard.

14. A constant current transformer comprising an oil retaining enclosure for the herein specified internal mechanism of said transformer, a magnetic core structure within said enclosure and having a vertical winding leg, primary and secondary windings currounding said winding leg, means for clamping one of said windings in said core structure, means for supporting the other of said windings for movement lengthwise of said winding leg, a vertical standard attached to said movable winding and having an upper end projecting above the normal oil level in said enclosure, a plurality of adjusting weights, and means for holding a selected number of said weights on the projecting upper end of said standard.

15. A constant current transformer comprising a magnetic core having a winding leg, primary and secondary windings surrounding said winding leg, one of said windings being stationary on said winding leg and the other of said windings being movable along said winding leg and mechanically biased towards said stationary winding from which it is moved against said bias in response to the magnetic repulsion existing between said windings due to current flow therein, winding clamps each of which has an adjustable slide located in a groove extending lengthwise of each end thereof for adjustably positioning said other of said windings in a pocket formed in the mid portion thereof, means for holding said slides in adjusted positions in said grooves with the ends thereof against said other of said winding seated in a desired position in said pocket, means for clamping between pairs of said winding clamps portions of said other of said windings which project from opposite outer sides of said winding leg of said magnetic core, and means for guiding said winding clamps lengthwise of said winding leg of said magnetic core.

16. A constant current transformer comprising a magnetic core structure having a vertical central winding leg and a pair of vertical outer legs which cooperate to define a pair of windows in said core structure, primary and secondary windings within said windows of said core structure and surrounding said central leg thereof, means for clamping one of said windings to said core structure, main and auxiliary shafts respectively spaced from and extending along the outer surfaces of said outer legs of said core structure, a bearing bracket mounted for movement lengthwise of said main shaft, a guide bracket having guide means in engagement with said auxiliary shaft, non-magnetic members each of which has an adjustable slide located in a groove extending lengthwise of each end thereof for positioning said other of said windings in a pocket formed in the mid portion thereof, means for holding said slides in adjusted positions in said grooves with the ends thereof against said other of said windings seated in a desired position in said pocket, means including said bearing bracket and said guide bracket respectively located at opposite ends of said members for forming a supporting carriage for said other of said windings, and means for clamping said other of said windings in said carriage between said members.

17. A constant current transformer comprising a magnetic core structure having a winding leg, a movable winding, means including a cylindrical shaft for guiding the movement of said winding along said winding leg of said core, a support for said shaft, and means for holding said shaft in said support, said means including caps seated in holes in said support and enclosing the ends of said shaft, each of said caps having a flanged body portion formed of resilient corrugations providing longitudinal inner and outer contact surfaces of limited area which respectively engage the outside of the end of the shaft which it encloses and the inside of the hole in which it is seated and held in place by said flange.

References Cited in the file of this patent

UNITED STATES PATENTS

| | | |
|---|---|---|
| 1,311,507 | Harlow | July 29, 1919 |
| 2,337,346 | Peterson | Dec. 21, 1943 |
| 2,667,949 | Shupe | Feb. 2, 1954 |